Dec. 17, 1940.    B. H. BROWALL    2,225,001
AUTOMATIC SLACK ADJUSTER FOR BRAKES
Filed July 1, 1939    3 Sheets-Sheet 1
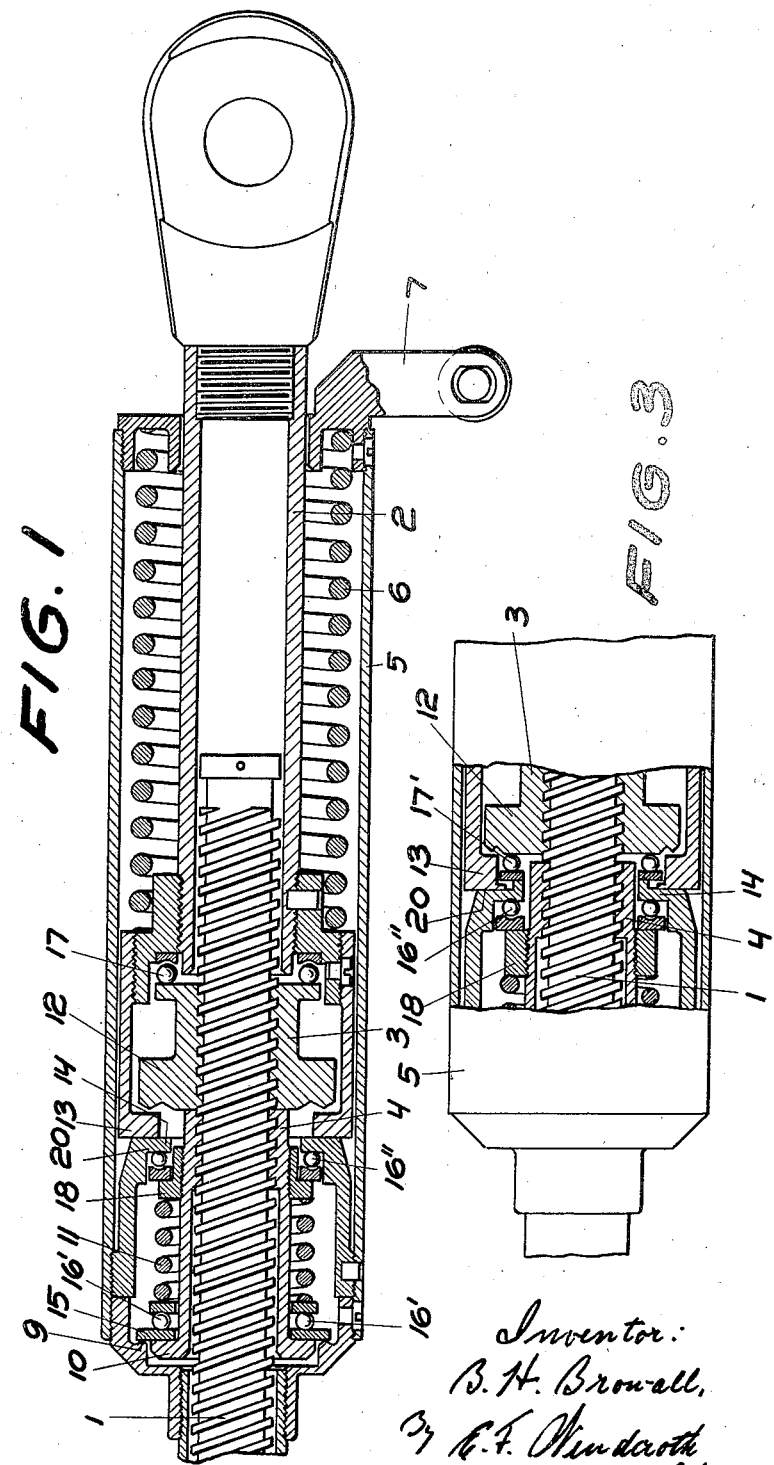
Inventor:
B. H. Browall,
by E. F. Wendroth
Atty Dec. 17, 1940. B. H. BROWALL 2,225,001
AUTOMATIC SLACK ADJUSTER FOR BRAKES
Filed July 1, 1939 3 Sheets-Sheet 2
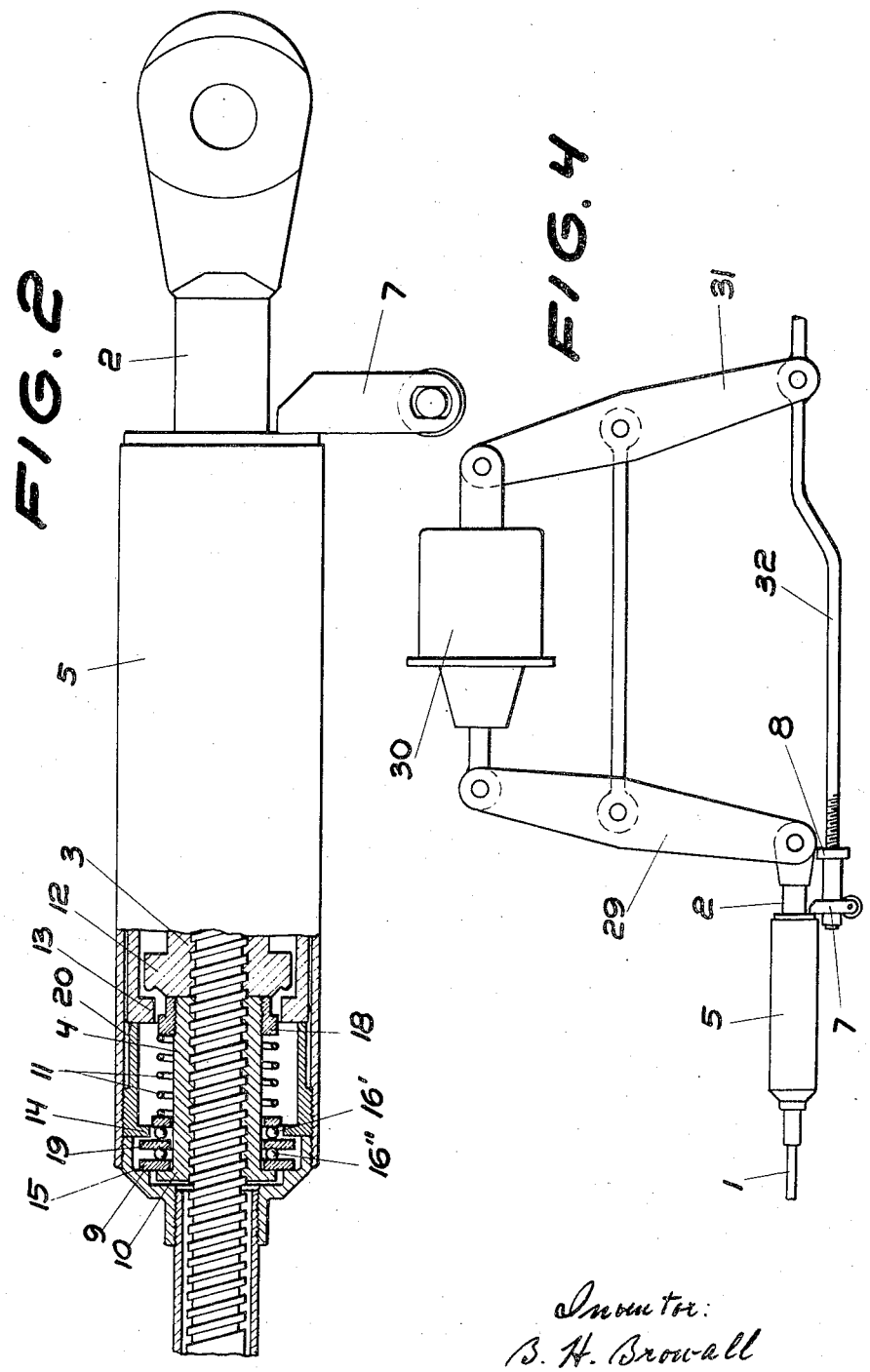
Inventor:
B. H. Browall
By E. F. Wenderoth
Atty

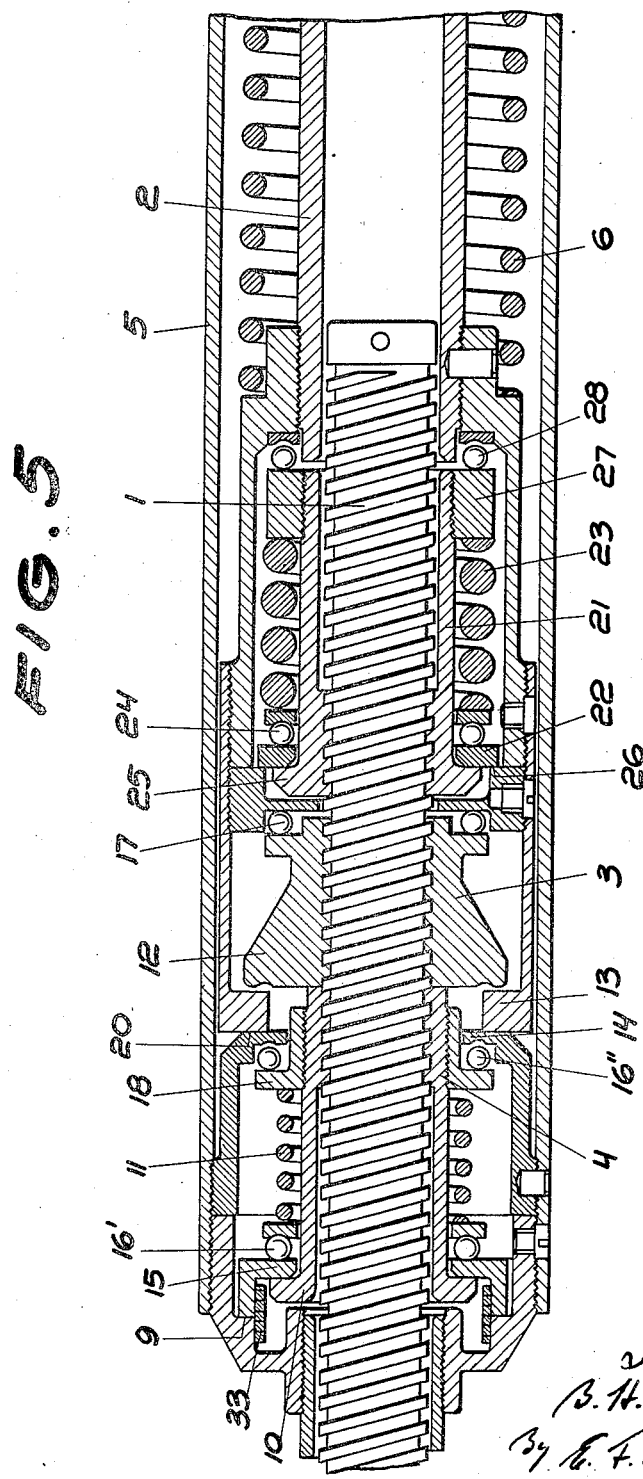

Patented Dec. 17, 1940

2,225,001

UNITED STATES PATENT OFFICE 2,225,001

AUTOMATIC SLACK ADJUSTER FOR BRAKES

Bert Henry Browall, Malmo, Sweden, assignor to Svenska Aktiebolaget Bromsregulator, Malmo, Sweden, a corporation of Sweden Application July 1, 1939, Serial No. 282,534
In Germany July 2, 1938

14 Claims. (Cl. 188—202)

This invention relates to automatic slack adjusters for brakes of the kind comprising a two-part brake rod one part of which is displaceable axially in relation to the other rod part and comprises a screw-threaded spindle, an operating member slidable axially on said other rod part and adapted to be displaced thereon in one direction at application and in the other direction at release of the brake, and axially displaceable nuts on said spindle for coupling said spindle to said other rod part and to said operating member under the control of the movements at application and release of the brake, respectively.

An automatic slack adjuster of this kind is already known, in which the threads of the spindle are of such a pitch as to make them non-selflocking, and in which said nuts are adapted to rotate on the spindle at their axial displacement thereon. In this already known slack adjuster, however, the nuts are rotatable and axially displaceable in one direction only on the spindle, namely in the direction for reducing excessive slack. For this reason the automatic slack adjuster is single-acting, that is capable only of reducing the slack when too large, and can not be made double-acting, that is capable not only of reducing the slack when too large but also of increasing the slack when too small. Further the slack reducing operation of the slack adjuster depends not only on the value of the slack but also on the elastic deflection of the brake rigging at the continued movement of the brake actuator after it having travelled the distance corresponding to the slack at the application of the brake. The elastic deflection of the brake rigging, however, varies with the brake pressure, and for this and other reasons it has been found desirable to make the operation of the slack adjuster independent of the elastic deflection of the brake rigging. For this purpose as well as for the purpose of enabling the slack adjuster to be made double-acting it is necessary that the nuts are axially displaceable in both directions on the spindle. To this end it has been proposed to make use of non-rotatable nuts split to enable them to be lifted with their threads out of engagement with the threads of the spindle, the nuts being slided with their threads over the threads of the spindle at the axial displacement of the nuts on the spindle. Obviously in this case the pitch of the threads of the spindle has no special function. The split nuts, however, by their rutching over the spindle very soon wear out or damage themselves and the threads of the spindle.

One object of the invention is to provide a slack adjuster of the kind set forth in the opening paragraph herein, in which the nuts are rotatable and axially slidable in relation to the screw-threaded spindle in both directions in such a manner that the slack reducing operation of the slack adjuster becomes independent of the elastic deflection of the brake rigging at braking, that the slack adjuster can be made double-acting if desired, and that the threads of the nut always are in engagement with the threads of the spindle.

Another object of the invention is to provide an automatic slack adjuster of the character set forth, which works in a reliable manner and is of a simple construction.

With these and other objects in view which will become apparent from the following detained description the invention consists in the construction, combination and organization of parts hereinafter described and illustrated by way of examples on the accompanying drawings and finaly pointed out in the appended claims.

In the drawings:

Fig. 1 is an axial section of one form of the automatic slack adjuster according to the invention.

Fig. 2 is a plan view, partly in section, illustrating a certain modification of the form of the automatic slack adjuster shown in Fig. 1.

Fig. 3 is a fragmental plan view, partly in section, illustrating another modification of the same form of the slack adjuster.

Fig. 4 is a fragmental plan view of a conventional form of brake rigging and illustrates one manner of mounting the automatic slack adjuster therein.

Fig. 5 is a fragmental axial section of another form of the automatic slack adjuster according to the invention.

As shown in the drawings the automatic slack adjuster comprises a two-part brake rod one part of which comprises a screw-spindle 1 projecting into the tubular other rod part 2 and having screw-threads of such a pitch as to make the screw-spindle non-selflocking. The screw spindle 1 has screwed on it a nut 3 for coupling the spindle to the other rod part 2, and a second nut 4 for coupling the spindle to an operating member 5. The latter is in the shape of a tubular casing which is axially slidable on the rod part 2 and houses a coiled compression spring 6 which is inserted between the rod part 2 and the operating member 5 and normally holds the latter pressed with an abutment 20 against an abutment such as a flange 13 carried on the rod part 2. The operating member 5, as is well known in the art, is adapted to be displaced axially on the rod part 2 against the action of the spring 6 when at an application of the brake the brake actuator continues its movement after having travelled the distance corresponding to the desired value of the slack. At release of the brake the operating member is returned to its normal position in relation to the rod part 2 by the spring 6. Different forms of actuating devices for the operating member 5 are known in the art, and according to the example illustrated in Fig. 4 the operating member 5 is provided with an abutment 7 for coaction with an abutment 8 moving in one direction in relation to the rod part 2 at application and in the other direction at release of the brake. Fig. 4 shows the two-part rod 1, 2 connected to a live brake lever 29 operated by a brake actuator 30 and having connected to it a dead brake lever 31 to which is linked a rod 32 carrying the abutment 8 which preferably is adjustable on said rod 32.

For taking the nut 4 along in the return movement of the axially slidable operating member 5 under the action of the spring 6 at release of the brake the operating member 5 is provided with an abutment 9 for coaction with an abutment ring 15 which is slidable and rotatable on the nut 4 and between which and a collar 18 on the nut 4 there is inserted a coiled compression spring 11. An antifriction thrust bearing 16' is inserted between the ring 15 and the spring 11. The ring 15 forms one part of a slip friction clutch the other part of which is formed by a flange 10 on the nut 4 and is pressed against the first named part 15 by the spring 11. For taking the nut 4 along in the axial displacement of the operating member 5 at the continued movement of the brake actuator, after the latter having travelled the distance corresponding to the desired value of the slack, the operating member 5 is provided with an abutment 14 coacting with an abutment such as the collar 18 on the nut 4, and an antifriction thrust bearing 16'' is inserted between the abutment 14 and the collar 18 for the easement of the rotation of the nut 4, which enables the nut 4 to be taken along in the said axial displacement. Instead of arranging this antifriction thrust bearing 16'' between the abutment 14 and the collar 18, it may be arranged between the spring 11 and the abutment ring 15 as in the modification illustrated in Fig. 2 wherein an abutment ring 19 is freely rotatable on the nut 4 and is inserted between the two antifriction thrust bearings 16' and 16'', the abutment 14 in this modification being arranged for coaction with this ring 19.

As long as the operating member 5 is not displaced with its abutment 20 away from the corresponding abutment 13 on the rod part 2 the nut 3 supports itself in axial direction against the operating member 5 by the intermediary of an antifriction thrust bearing. As shown in Figs. 1, 2 and 5 this bearing may be the same as the antifriction thrust bearing 16' already provided for the nut 4 which is supported against the operating member 5 in the slack increasing direction by this bearing 16' and in turn abuts the nut 3 and holds the latter out of contact with the abutment flange 13 on the rod part 2. If it is desired to desist from thus saving one antifriction bearing in the slack adjuster a separate antifriction bearing 17' may be arranged for the axial support of the nut 3 against the operating member 5 according to the modification illustrated in Fig. 3. The nut 3 is provided with a flange 12 with which it at commencing movement of the operating member 5 against the action of the spring 6 engages the abutment flange 13 on the rod part 2, the nut 3 being thereby locked against rotation in the slack increasing direction. When rotating and moving axially on the spindle 1 in the slack reducing direction the nut 3 supports itself axially against the rod part 2 by means of an antifriction thrust bearing 17.

In the drawings the slack adjuster is shown in the position corresponding to released brake. At commencing application movement of the brake, as long as the force transmitted from rod part 2 to the spindle 1 only has to overcome the resistance against movement of the brake rigging, the nut 4 must be held against rotation in order to enable the spring 6, the operating member 5 and the nut 4 to take the spindle 1 along in the movement of rod part 2. For this purpose, in the forms of the slack adjuster shown in Figs. 1-3, the power of the spring 11 must be sufficient for holding the flange 10 in such a frictional engagement with the abutment ring 15 as to prevent the flange 10 from slipping in relation to the abutment ring 15 which in turn abuts the abutment 9 and is thereby held against rotation. Should the slack be too small, that is should the brake stress arise in the brake rigging before the operating member 5 is displaced axially by the coacting abutments 7, 8, the spring 11 yields under the increasing stress in the brake rod 1, 2, whereby the friction clutch 10, 15 is released or enabled to slip under the action of the torque on the nut 4, which is produced by the braking stress due to the non-selflocking character of the threads of the spindle 1. Consequently, the two nuts 3 and 4 will rotate and move axially on the spindle 1 in the slack increasing direction. When the brake actuator has travelled the distance corresponding to the desired value of the slack and when, at the commencing axial displacement of the operating member 5 against the action of the spring 6, the nut 3 with its abutment flange 12 has engaged the abutment flange 13 on the operating member 5 the rotation of the nut 3 is stopped, whereby the spindle 1 is coupled to the rod part 2. The brake stress is now transmitted from the rod part 2 through the abutments 13 and 12 and the nut 3 to the spindle 1.

Should the slack be too large, that is should the abutment 8 reach the abutment 7 before the brake stress arises in the brake rigging, the commencing axial displacement of the operating member at the continued movement of the brake actuator results in the nut 3 being locked against rotation by the flange 12 engaging the flange 13, whereby the spindle 1 is locked to the rod part 2. At the continued axial displacement of the operating member 5 through the coacting abutments 7 and 8 the operating member 5 through its abutment 14 displaces the nut 4 axially on the spindle 1 to the left in the figures on the drawings. This displacement of the nut 4 is enabled by rotation of the same, and this rotation takes place easy due to the provision of the antifriction thrust bearing 16''. At the displacement of the nut 4 in this direction on the spindle 1 the friction clutch 10, 15 is inoperative due to the fact that the abutment ring 15 loses its engagement with the abutment 9 and can rotate freely. When at the release of the brake the operating member 5 is displaced to the right in the figures on the drawings in relation to the rod part 2 by the action of the spring 6, the abutment 9 and the abutment ring 15 again become operative for taking, by the intermediary of the spring 11, the nut 4 along in the displacement of the operating member 5. When thus abutting the abutment 9 the abutment ring 15 is held against rotation. At the beginning of the brake release movement, until the brake stress has ceased, the spring 11 will yield a little at the displacement of the operating member 5, so that the friction clutch 10, 15 can slip, and so the nut 4 is displaced under rotation on the spindle 1. But as soon as the brake stress in the brake rigging has ceased the frictional contact between the clutch members 10, 15 will suffice for holding the nut 4 against rotation, so that the axial displacement of the operating member 5 in relation to the spindle 1 ceases and so that at the continued brake release movement the operating member 5 and the spindle 1 are displaced in unison in relation to the rod part 2 and the nut 3 in the slack reducing direction until the operating member 5 has returned to its normal position. At this slack reducing movement the nut 3 rotates against its antifriction thrust bearing 17.

In order to eliminate the necessity of making the spring 11 which serves the purpose of pressing the parts of the friction clutch 10, 15 together and, consequently, also the spring 6 so strong that the action of these springs under all conditions is sufficient for overcoming the resistance against the idle movement of the brake rigging, even if it should be heavy to move, there may be arranged in addition to the nuts 3 and 4 a third nut 21 on the spindle 1 as illustrated in Fig. 5. This third nut 21 serves the purpose of strengthening the tendency of the spindle 1 to follow the other rod part 2 at the application of the brake and is provided, much in the same manner as the nut 4, with a slip friction clutch. One part 25 of this friction clutch is provided on the nut 21, and the other part 22 consists of an abutment ring 22 with which the nut 21, at the application movement of the brake, supports itself against an abutment 26 on the rod part 2, a coiled compression spring 23 which serves the purpose of pressing the parts of the friction clutch 22 and 25 together being inserted between the abutment ring 23 and a collar 27 or the like on the nut 21. An antifriction thrust bearing 24 is inserted between the spring 23 and any one of its supports, preferably the abutment ring 22 as shown. The spring 23 can be made so strong that it under all conditions is sufficient for overcoming the greatest resistance against the idle movement of the brake rigging, even if it should be heavy to move. Thus it is possible to make the spring 11 for the nut 4 and, consequently, the spring 6 weaker without running the risk of the slack adjuster performing an unintentional slack increasing movement, even if the resistance against idle movement of the brake rigging should attain a rather high value. At the brake release movement the nut 21 supports itself against the rod part 2 through an antifriction bearing 28 for the easement of the rotation which the nut 21 has to perform at the relative displacement of the two rod parts 1 and 2 in the slack reducing direction.

As illustrated in Fig. 5 the abutment ring 15, if desired, may be connected with the operating member 5 by a one-way locking device, preferably in the form of a one-way clutch spring 33, for positively preventing rotation of the ring 15 in one direction, namely in the direction of slack increasing rotation of the nut 4.

In the forms of the invention herein described for the purpose of illustration the automatic slack adjusted is double-acting, that is capable not only of reducing the slack when too large but also of increasing the slack when too small. The capability of the slack adjuster to increase the slack when too small is due to the nut 3 being supported with its flange 12 out of contact with the abutment flange 13 on the rod part 2 by the operating member 5 through the nut 4, or otherwise, until at the application of the brake the brake actuator has travelled the distance corresponding to the desired value of the slack. By desisting from said support of the nut 3 during part of the application movement of the brake, so that the nut 3 engages the abutment 13 during the whole of said movement, the slack adjuster is made single-acting, that is capable only of reducing the slack when too large. Although it is preferable in most cases to make the slack adjuster double-acting the invention is not limited hereto since the essential features of the invention are useful and advantageous also in the case the slack adjuster is made single-acting.

What I claim and desire to secure by Letters Patent is:

1. An automatic slack adjuster for brakes, comprising a two-part brake rod one part of which is displaceable axially in relation to the other rod part and comprises a screw-threaded spindle the threads of which are of such a pitch as to make them non-selflocking, an operating member displaceable axially on said other rod part and adapted to be displaced in relation thereto in one direction at application and in the other direction at release of the brake, a first nut on said spindle for coupling said spindle to said other rod part at application of the brake, a second nut on said spindle, adapted to be axially displaced on said spindle in both directions by said operating member, an anti-friction thrust bearing for rendering said second nut easily rotatable at axial displacement in one of said directions, and means including a slip friction clutch for rendering said second nut rotatable at axial displacement in the opposite direction only when acted upon with a certain amount of force.

2. An automatic slack adjuster as claimed in claim 1, in which said means forming said slip friction clutch comprises a flange on said second nut, an axially movable and rotatable abutment member on said nut for coaction with an abutment on said operating member, and a spring acting between said abutment member and said second nut for pressing the latter with its said flange in frictional contact with said abutment member and for mediating the axial support of said second nut against said operating member at the axial displacement thereof at release of the brake.

3. An automatic slack adjuster as claimed in claim 1, in which an antifriction thrust bearing is provided for rendering said first nut easily rotatable and for axially supporting the same against said operating member in a position out of contact with an abutment on said other rod part until at application of the brake the axial displacement of said operating member in relation to said other rod part commences, said first nut being permitted by such commencing movement of said operating member to abut said abutment on said other rod part and thereby to lock itself against movement in slack increasing direction in relation to said spindle.

4. An automatic slack adjuster as claimed in claim 1, which includes a third nut on said spindle, means forming a slip friction clutch between said third nut and said other rod part for axially supporting said third nut against said other rod part in one direction, and an antifriction thrust bearing for axially supporting said third nut against said other rod part in the other direction.

5. An automatic slack adjuster for brakes, comprising a two-part brake rod one part of which is displaceable axially in relation to the other rod part and comprises a screw-threaded spindle the threads of which are of such a pitch as to render them non-selflocking, an operating member movable axially on said brake rod and adapted to be moved axially in relation to said other rod part in one direction at application and in the other direction at release of the brake, a first nut screwed on said spindle for coupling said spindle to said other rod part, a second nut screwed on said spindle, two antifriction thrust bearings interposed between said operating member and said second nut for transmitting the axial movements of said operating member in one direction and the other, respectively, to said second nut, and means for producing a slip frictional resistance against rotation of said second nut at axial displacement thereof by the axial movement of said operating member at release of the brake 6. An automatic slack adjuster for brakes, comprising a two-part brake rod one part of which is displaceable axially in relation to the tubular other rod part and comprises a screw-threaded spindle the threads of which are of such a pitch as to make them non-selflocking, an operating member in the shape of a tubular casing slidable axially on said brake rod and adapted to be displaced axially in relation to said other rod part in one direction at application and in the other direction at release of the brake, a first nut screwed on said spindle for coupling said spindle to said other rod part at application of the brake, a second nut screwed on said spindle for coupling said spindle to said operating member at release of the brake, means including an antifriction thrust bearing for rendering said second nut easily rotatable and for axially supporting the same against said operating member at the axial displacement thereof at application of the brake, a spring carried on said second nut for yieldingly supporting said second nut axially against said operating member at the axial displacement thereof at release of the brake, an abutment member axially movable and rotatable on said second nut and interposed between said spring and said operating member for coaction with an abutment thereon, and a flange on said second nut, with which said second nut is pressed axially by said spring against said abutment member for slip frictionally coupling said second nut to said abutment member.

7. An automatic slack adjuster as claimed in claim 6, which includes a third nut on said spindle for aiding in coupling said spindle to said other rod part, a spring carried on said third nut for yieldingly supporting said third nut axially in one direction against said other rod part, an abutment member axially movable and rotatable on said third nut and interposed between said spring on said third nut and said other rod part for coaction with an abutment thereon, and a flange on said third nut, with which said third nut by said spring thereon is pressed axially against said movable abutment member on said third nut, said spring on said third nut being stronger than said spring on said second nut.

8. An automatic slack adjuster as claimed in claim 6, in which said spring supports itself at one end against said abutment member on said second nut by the intermediary of an antifriction thrust bearing, and in which said second nut, until at application of the brake the axial displacement of said operating member in relation to said other rod part commences, abuts said first nut and thereby holds the latter in a position out of contact with an abutment on said other rod part, with which said first nut is permitted to make contact and thereby to lock itself against rotation at the commencement of the said axial displacement of said operating member at the application of the brake.

9. An automatic slack adjuster as claimed in claim 1, in which there is provided a one-way locking device connecting said slip friction clutch to said operating member and acting against rotation in the slack increasing direction.

10. An automatic slack adjuster as claimed in claim 1, in which said second nut is adapted to axially support said first nut in a position out of contact with an abutment on said other rod part until, at application of the brake, the axial displacement of said operating member and said second nut in relation to said other rod part commences, said first nut being permitted by such commencing movement of said operating member and said second nut to abut said abutment on said other rod part and thereby to lock itself against movement in slack increasing direction in relation to said spindle.

11. An automatic slack adjuster as claimed in claim 6, in which there are provided on said second nut a second axially movable and rotatable abutment member adapted for coaction with an abutment on said operating member for taking said second nut along in the axial displacement of said operating member at application of the brake, said antifriction thrust bearing being inserted between said abutment members, and a second antifriction thrust bearing inserted between said spring and said second abutment member.

12. An automatic slack adjuster as claimed in claim 6, in which said second nut, until at application of the brake the axial displacement of said operating member in relation to said other rod part commences, abuts said first nut and thereby holds the latter out of contact with an abutment for the same on said other rod part, and in which there are provided on said second nut a second axially movable and rotatable abutment member adapted for coaction with an abutment on said operating member for taking said second nut along in the axial displacement of said operating member at application of the brake, said antifriction thrust bearing being inserted between said abutment members, and a second antifriction thrust bearing inserted between said spring and said second abutment member.

13. An automatic slack adjuster as claimed in claim 6, in which there is provided a one-way locking device connecting said abutment member to said operating member for positively preventing rotation of said abutment member in the direction of slack increasing rotation of said second nut.

14. An automatic slack adjuster for brakes, comprising a two-part brake rod one part of which is displaceable axially in relation to the other rod part and comprises a screw-threaded spindle the threads of which are of such a pitch as to render them non-selflocking, an operating member movable axially on said brake rod and adapted to be moved axially in relation to said other rod part in one direction at application and in the other direction at release of the brake, a first nut screwed on said spindle, an antifriction thrust bearing interposed between said first nut and said other rod part to facilitate rotation of said first nut in one direction, coacting seats on said first nut and said other rod part to prevent rotation of said first nut in the other direction and thus coupling said spindle to said other rod part, a second nut screwed on said spindle, two antifriction thrust bearings interposed between said operating member and said second nut for transmitting the axial movements of said operating member in one direction and the other, respectively, to said second nut, coacting abutment surfaces on said first and second nuts to keep said seat on said first nut out of engagement with the corresponding seat on said other rod part as long as said second nut and said operating member take a position in relation to each other corresponding to released brake, and means for producing a slip frictional resistance against rotation of said second nut at axial displacement thereof by the axial movement of said operating member at release of the brake.

BERT HENRY BROWALL.